April 2, 1946.   D. K. ALLISON   2,397,518
FIRE CONTROL VALVE AND FUEL LINE
Filed Sept. 14, 1942   2 Sheets-Sheet 1
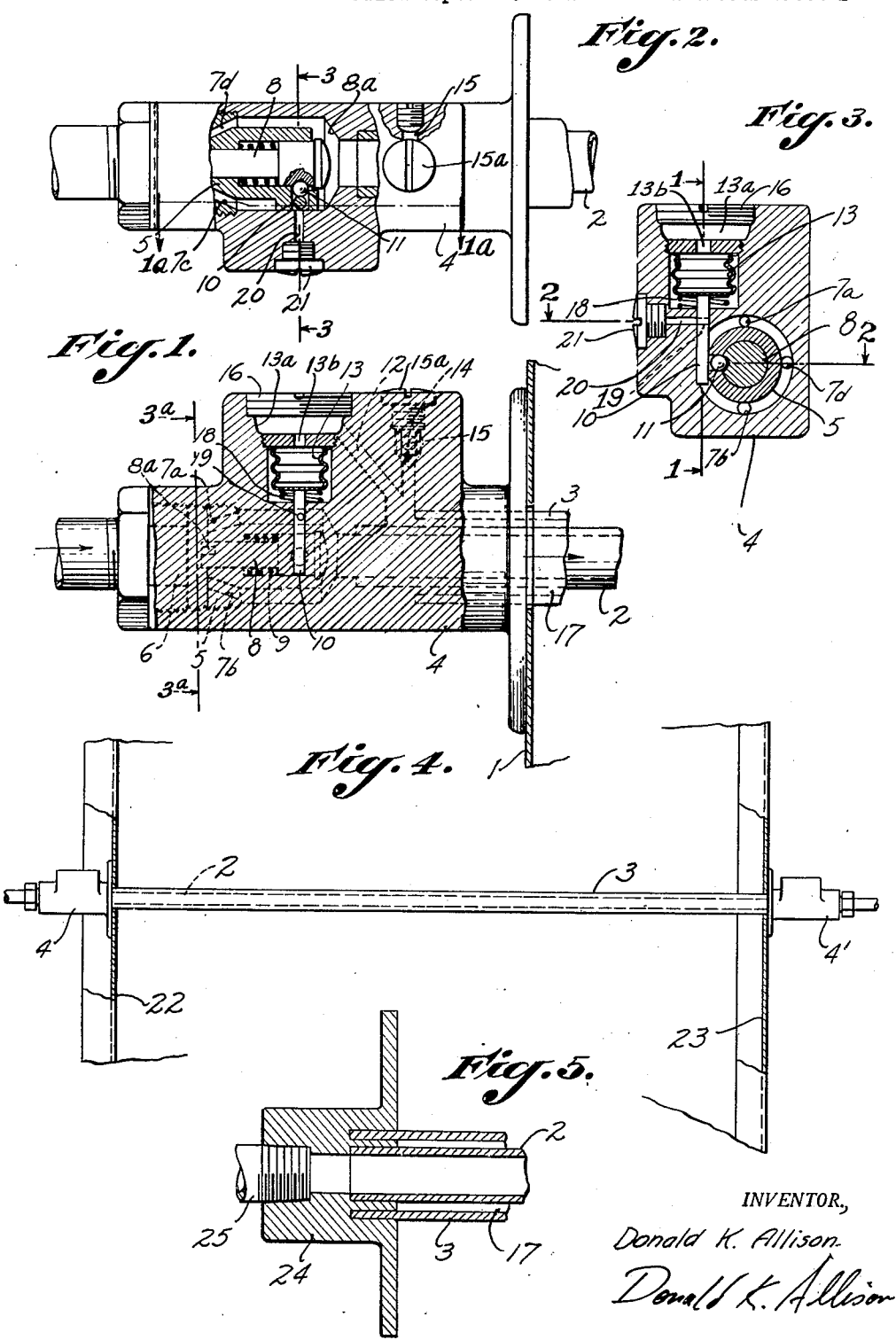

April 2, 1946. D. K. ALLISON 2,397,518
FIRE CONTROL VALVE AND FUEL LINE
Filed Sept. 14, 1942 2 Sheets-Sheet 2
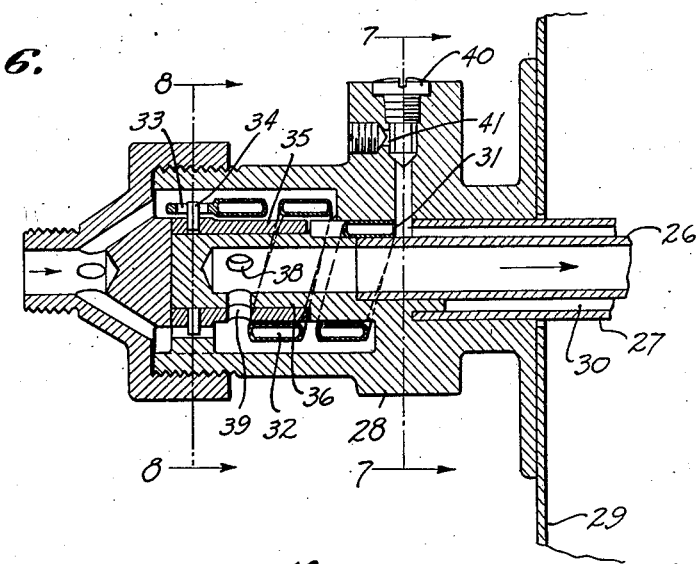
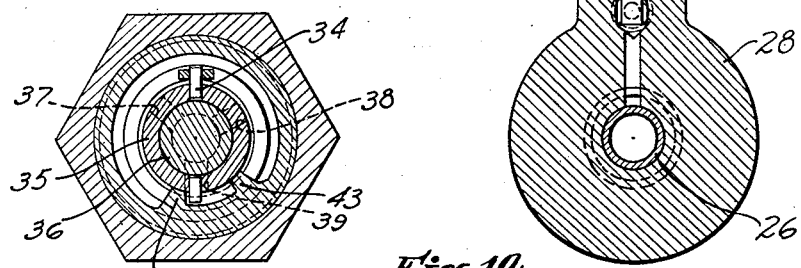
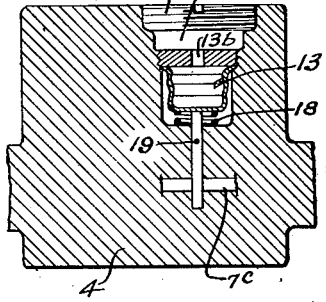
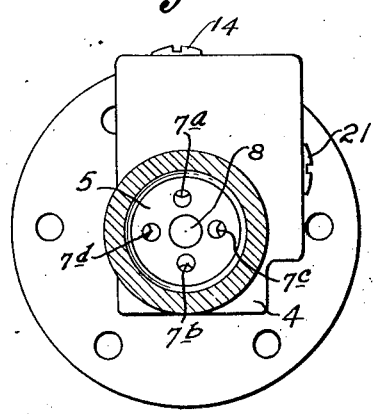
INVENTOR.,
Donald K. Allison.

Patented Apr. 2, 1946

2,397,518

UNITED STATES PATENT OFFICE 2,397,518

FIRE CONTROL VALVE AND FUEL LINE

Donald K. Allison, Beverly Hills, Calif.

Application September 14, 1942, Serial No. 458,301

4 Claims. (Cl. 169—2)

My invention relates to fluid valves and lines, and more particularly for airplane fuel and oil lines to eliminate the hazard of fire from ruptures or leak of the line. My invention will be exemplified with reference to the gasoline lines of an airplane without intention to limit the invention thereto.

Probably the greatest hazard in the operation of military aircraft lies in the danger of fire within the aircraft structure caused by ignition of the fuel by incendiary bullets. Development of the self-sealing bullet-proof gasoline tank has overcome this danger for this element, but many disastrous fires still occur in airplanes due to rupture of a fuel line by enemy bullets or shell fragments. Also it has been found that leaks may develop in fuel lines from causes such as vibration, crystallization, and general mechanical failure, permitting the escape of dangerous quantities of fuel into the plane structure, with the attendant hazard of subsequent ignition by the engine exhaust or other causes. Means have been devised in the past whereby solenoid valves may be electrically controlled by the pilot to shut off or isolate a broken or leaking fuel line after he has become aware of its failure. However, the time interval that may elapse between the initial rupture or leak of the line, and its detection by the pilot and his operation of the corresponding solenoid valve, may easily permit an uncontrollable fire to gain headway.

It is an object of this invention to provide a valve and fuel line structure which automatically and instantly closes in the event of rupture by bullet or shell fragment.

It is a further object of this invention to provide a fuel line structure in which the possibility of any outward leak of fuel is entirely eliminated.

Another object of the invention is to provide a fuel line structure which smothers the area of any rupture or leak in the fuel line with a fire extinguishing atmosphere.

It is a further object of the present invention to provide a valve and fuel line structure which is light in weight and simple in construction.

A further object of the invention is to provide detection of minor fuel line leaks and anticipation of major leaks.

It is another object of the invention to provide a fuel line structure and valve which requires no auxiliary wiring, switches, or accessories.

Further objects and advantages of the invention will be apparent to those skilled in the art from a consideration of the following exemplary description of several embodiments of the invention.

Referring to the drawings:

Figure 1 is a longitudinal section of the fire control valve showing the mechanism and taken substantally along line 1—1 of Figure 3.

Figure 1a is a sectional view taken along line 1a—1a of Figure 2.

Figure 2 is a partial longitudinal section of the fire control valve taken substantially along lines 2—2 of Figure 3.

Figure 3 is a vertical cross-sectional view taken along the line 3—3 of Figure 2.

Figure 3a is a sectional view taken along line 3a—3a of Figure 1.

Figure 4 is a utility view showing the mode of assembly and use of the fuel line structure and valve.

Figure 5 is a vertical sectional view of a terminus block for use in my invention.

Figure 6 is a sectional view of an alternative form of my invention.

Figure 7 is a vertical sectional view taken along the line 7—7 of Figure 6.

Figure 8 is a vertical sectional view taken along the line 8—8 of Figure 6.

Referring particularly to Figure 1 which shows the fuel control valve and fuel line in section: 1 represents the wall of any element of the fuel distribution system such as a tank, header, or pump. The fuel distribution line is indicated by 2, and may be of the usual flexible copper tubing. Surrounding this fuel line throughout its entire length is a guard tube 3 which may likewise be constructed of copper tube and may be light in weight. The fuel line and guard tube terminate in the valve block 4 and are securely attached thereto by suitable means, such as silver solder. The valve block 4 is provided with the plunger insert 5 which is mounted centrally in the fuel passage 6. The plunger insert 5 is provided with fuel ports 7a, 7b, 7c, and 7d which are disposed circumferentially around the valve plunger 8. The valve plunger 8 is actuated by a plunger spring 9 and is held in retracted position by a bellows pin 10 and the ball 11. The valve block 4 is provided with a recess 13a in its upper portion which is closed by a plug 16 and in this recess there is mounted a bellows 13. An aperture 13b in the top of the bellows affords communication between the interiors of the bellows and the recess. A passage 12 connects the recess and the annulus 17. A port 15 in the block 4 provides for the admission of gas into the annulus and this port is controlled by the needle valve 14 and closed by the plug 15a. Details of the plunger stop arrangement are best shown in Figures 2 and 3. Here the valve plunger 8 is shown held in its retracted position by the ball 11 held in the socket in the valve plunger 8 by bellows pin 10.

The bellows 13, passage 12 and the annulus 17 between fuel line 2 and guard tube 3 are filled with fire extinguishing fluid which may be liquid and/or gas under elevated pressure. The pressure of this fluid expands the bellows 13 to its extended position against the force of the bellows spring 18. The bellows pin 10 is provided with a hole 19 by which the bellows may be manually held in extended position during gas filling operation by a probe inserted through the opening 20 which is later closed by the gasketed screw 21.

In the preferred form of my invention, the fuel line 2 and guard tube 3 terminate at their extreme ends in a valve structure similar to that which has just been described, as shown in Figure 4.

Referring to Figure 4, the area shown between the bulkheads 22 and 23 is a critical area which it is desired to protect from possible fire caused by escape of gasoline from any rupture or leak of the fuel line 2. As will be seen from the figure, the entire length of the fuel line traversing the critical area between the bulkheads is entirely surrounded by the guard tube 3. Extremities of both fuel line and guard tube terminate outside the bulkheads in the valve bodies 4 and 4'.

Operation of my device is as follows:

Referring to Figure 4, valve 4' is identical in construction to valve 4 and the elements thereof will hereinafter be designated by corresponding prime numerals. In order to retract the valve plungers 8 and 8', the fuel lines to the valves 4 and 4' are disconnected and the valve plungers are moved to the position shown in Figs. 1 and 2 in any suitable manner, as by means of threading a rod into threaded openings 8a in the end of each plunger and moving the latter to the left. The assembly plugs 16 and 16' are then removed from the valve bodies, and by suitable mechanical means the bellows 13 and 13' are forced to their extended position while at the same time the valve plungers 8 and 8' are held in their fully retracted positions, so that the balls 11 and 11' engage their corresponding sockets in the valve plungers. The gasketed screws 21 and 21' are removed, and suitable mechanical means such as small rods or probes are inserted through the openings 20 and 20' to engage the holes 19 and 19' in the bellows pins 10 and 10'. Assembly port plugs 16 and 16' are now replaced securely in the valve bodies.

The annulus 17 between the fuel line and the guard tube, and in addition the chambers within the bellows 13 and the recess 13a, are now filled with liquid and/or gas under elevated pressure through the pressure port 15. The pressure within this system is brought substantially above that required to hold the bellows 13 and 13' in their extended position against the force of bellows springs 18 and 18'. The needle valve 14 is now closed securely and the pressure port 15 closed by its corresponding plug. The mechanical means for holding the bellows in extended position are removed and the gasketed screws 21 and 21' are replaced in position. The fire control valve and fuel line assembly is now ready for operation.

Referring again to the figures it will be seen that any rupture or damage to fuel line 2 or guard tube 3 will permit escape of the pressure fluid held in the annular space and bellows system. The pressure in this system therefore falls to atmospheric pressure and the bellows springs force the bellows into the retracted position, withdrawing the bellows pins. This permits the steel balls 11 and 11' to disengage their respective sockets in the valve plungers 8 and 8', and permits the valve springs 9 and 9' to force the valve plungers tightly against the valve seats, thereby shutting off all flow of fuel into or from the fuel line. At the same time, the major portion of the fire extinguishing fluid contained within the annulus is ejected forcibly at the point of rupture, and thereby immediately extinguishes any initial flare-up of the fuel caused by incendiary bullets. In addition, this fluid maintains an inert atmosphere in the vicinity of the rupture for a sufficient period to permit evaporation or dissipation of any small amount of fuel that might escape from the fuel line. I have found that this fire extinguishing fluid may be either liquid or gas. For example, I have found that the annular space and the bellows chambers may be filled with carbon tetrachloride saturated with carbon dioxide gas under pressure. Alternatively, carbon dioxide gas, nitrogen gas, liquid carbon dioxide or other fire extinguishing fluid under pressure may be employed. Furthermore, should any leaks occur in the fuel line from vibration, mechanical failure, or other cause, the pressure within the annular space surrounding the fuel line will prevent any outward leakage of fuel therefrom, and the gradual loss of pressurant from the surrounding annular space will within a short time produce a sufficient reduction in pressure within the bellows to trip the valve plunger releases and close the system. If desired, the presence of leaks may be readily indicated by the application of pressure actuated contacts and a suitable alarm system.

Referring again to the figures, it will be seen that under proper conditions the action of the bellows pin in releasing the valve plunger is not at all critical, and is not affected by vibration or minor pressure or temperature changes. The pressure within the annulus and bellows system may be established sufficiently above that pressure necessary to counteract the force of the bellows spring so that a substantial reduction in pressure must occur before any motion of the bellows pin transpires. Thus minor changes in the relative pressure within the bellows such as might be caused by temperature changes or changes in the external pressure will not produce sufficient motion of the bellows pin to release the ball holding the valve plunger, and furthermore minor leaks within the system can exist for a considerable period before sufficient pressure change takes place to cause closure of the valves. However, the existence of such leaks can be instantly detected by connecting a suitable pressure gauge to the pressure port 15 and opening the needle valve 14. Any reduction in pressure below the standard value initially established in the system is presumptive evidence of a leak in the system.

In some cases the fuel line may lead to some element which does not contain substantial quantities of fuel within the element itself, such as a pressure gauge. In the event of rupture of such a fuel line only an inconsequential amount of gasoline would drain from the element and here the terminus end of the fuel line and guard tube may be fitted merely with the terminus block shown in Figure 5. When employing this terminus block, any rupture or leak in the fuel line closes the fire control valve at the source as described above, and the inert atmosphere maintained in the vicinity of the rupture by the fluid contained in the annulus and bellows system effectively prevents ignition of any small amount of fuel which may drain from the fuel line and element beyond the break. Referring to Figure 5, the fuel line 2 and the guard tube 3 are securely affixed by suitable means, such as silver solder, to a terminus block 24, which in turn is connected to the nipple 25.

A modified form of my invention is shown in Figure 6. In this form of my invention, the fuel line 26 is again surrounded by the guard tube 27. These tubes are securely attached to the valve body 28, which in turn is mounted on the wall 29 of the space to be protected. The annulus 30 formed between the fuel line 26 and the guard tube 27 is in communication at opening 31 of hollow helical tube 32, whose free end carries a longitudinal slot 33, engaging a pin 34, carried on the outer sleeve 35 of the sleeve valve, which is free to rotate around the inner sleeve 36. Fuel enters the valve body from the left through the ports 37, 38, and 39 in the inner sleeve and flows thence through the fuel line to the terminus or point of use. The annular space 30 is filled with fire extinguishing fluid as above described, through the pressure port 41 controlled by the needle valve 40. The outer valve sleeve 35 is provided with holes which register with ports 37, 38 and 39 when in open position and it also has a stop 42 to prevent its clockwise rotation beyond the fully open position in one direction, and a stop 43 to prevent its counter-clockwise rotation beyond the fully closed position in the other direction, as is best shown in Figure 8.

The operation of this modified form of my invention, is substantially the same as that described for the form shown in Figure 1, with the distinction however that pressure within the annular space and helical coil system tends normally to maintain the helical coil in the unwound or extended position, which in turn serves to rotate the outer valve sleeve 35 to its fully open position against the stop 42. As long as this condition persists, the fuel is free to flow from the source to the terminus or point of use. In the event of any rupture or leak, the pressure of the fluid within the annulus and helical tube system rapidly decreases, permitting the helical tube to wind or tighten its convolutions, which thereby rotates the free end of said helical tube, which in turn rotates the outer valve sleeve 35 to its closed position against the stop 43, thereby closing ports 37, 38, and 39, and shutting off the supply of fuel. At the same time the vicinity of the rupture or leak is surrounded with an inert atmosphere of fire extinguishing fluid as outlined above.

By maintaining the pressure of the fluid in the helical tube well above that necessary to rotate the sleeve 35 clockwise against the stop 42, this modified form of the valve may likewise be rendered independent of vibration and minor pressure and temperature changes.

This modified form of fire control valve may be arranged as shown in Figure 4 with a valve at both ends of the critical fuel line section, or optionally may be provided with a terminus block, as shown in Figure 5, at the terminal end of the fuel line.

It will be clear that the embodiments herein described have been selected for illustrative purposes only, and that various modifications can be made in the details thereof without departing from the spirit of the invention. It will also be apparent that the invention comprehends generally provision of a shut-off valve for any fluid transmission line actuated by a change in pressure in an annulus formed between the fluid line and a concentric guard tube.

While I have described my invention as applied to gasoline fuel lines of an airplane, it will be readily apparent that it is likewise applicable to the oil lines and engine coolant lines of the airplane, and may be extended to other services such as the protection of water lines, gas lines, chemical lines, etc., without departing from the spirit of the invention as defined in the appended claims.

I claim as my invention:

1. In a fluid distributing system, the combination of a fluid transmission line, means forming an annular chamber surrounding said line and adapted to be charged with a gas under pressure, valve means for controlling the flow of fluid through said line, resilient means to close said valve means, a latch mechanism normally maintaining said valve means in open position, and flexible means responsive to a decrease in the pressure in said chamber to release said latch mechanism.

2. In a fluid distributing system the combination of a fuel line, a control valve for said fuel line including a valve body, a passage in said body communicating with said fuel line, spring actuated valve means within said passage, spherical means retaining said valve means in open position, a pin movable against said spherical means, a flexible bellows carrying said pin, and a pipe surrounding said fuel line and being in communication with said flexible bellows.

3. In a fluid distributing system the combination of a fuel line having a spring actuated valve associated therewith to control the flow of fuel therethrough, latch means retaining the valve in open position against the tension of said spring, a pressure responsive device for controlling said latch means, and a pipe surrounding said fuel line and being in communication with said pressure responsive device.

4. In a fluid distributing system the combination of a fuel line having a spring actuated valve associated therewith to control the flow of fuel therethrough, means independent of said valve for retaining the valve in open position against the pressure of the spring, a pressure responsive device for controlling said independent means, and means forming a chamber surrounding said fuel line and communicating with said pressure responsive device.

DONALD K. ALLISON.